(12) United States Patent
Taguchi

(10) Patent No.: US 11,306,612 B2
(45) Date of Patent: Apr. 19, 2022

(54) VIBRATION REDUCING DEVICE FOR GAS TURBINE ENGINE

(71) Applicant: HONDA MOTOR CO., LTD., Tokyo (JP)

(72) Inventor: Shu Taguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 36 days.

(21) Appl. No.: 16/802,752

(22) Filed: Feb. 27, 2020

(65) Prior Publication Data

US 2020/0284159 A1 Sep. 10, 2020

(30) Foreign Application Priority Data

Mar. 6, 2019 (JP) .............................. JP2019-040174

(51) Int. Cl.
*F01D 25/04* (2006.01)

(52) U.S. Cl.
CPC .......... *F01D 25/04* (2013.01); *F05D 2260/96* (2013.01)

(58) Field of Classification Search
CPC ...... F01D 25/04; F01D 21/04; F05D 2260/96; Y02T 50/60
USPC ........................................................ 415/119
See application file for complete search history.

(56) References Cited

U.S. PATENT DOCUMENTS

| 4,669,893 | A | * | 6/1987 | Chalaire | ............... F16C 27/045 |
| | | | | | 384/99 |
| 2015/0292562 | A1 | * | 10/2015 | Maeda | ...................... F02C 7/06 |
| | | | | | 384/280 |
| 2017/0191377 | A1 | * | 7/2017 | Longacre | ................. F16C 27/08 |
| 2018/0291814 | A1 | * | 10/2018 | Anglin | ................... F16C 33/768 |
| 2018/0371998 | A1 | * | 12/2018 | Sheridan | ................. F01D 15/12 |

FOREIGN PATENT DOCUMENTS

JP H08-261231 10/1996

* cited by examiner

*Primary Examiner* — Yi-Kai Wang

(74) *Attorney, Agent, or Firm* — Rankin, Hill & Clark LLP

(57) ABSTRACT

A vibration reducing device for a gas turbine engine includes a rotating shaft containing a first mass member, a plurality of bearings rotatably supporting the rotating shaft, and a stationary body supporting the bearings. An annular second mass member having an internal diameter thereof larger than an external diameter of the rotating shaft is rotatably supported in a contact state at a position on the rotating shaft, at which position centrifugal whirling vibration is generated due to imbalance of the first mass member. Therefore, due to the second mass member being eccentric in an opposite phase with respect to the rotating shaft eccentrically undergoing centrifugal whirling, it is possible to counterbalance a centrifugal force acting on the first mass member with an inertial force acting on the second mass member, thus enabling a damping effect to be exhibited and reducing effectively the centrifugal whirling vibration of the rotating shaft.

7 Claims, 8 Drawing Sheets

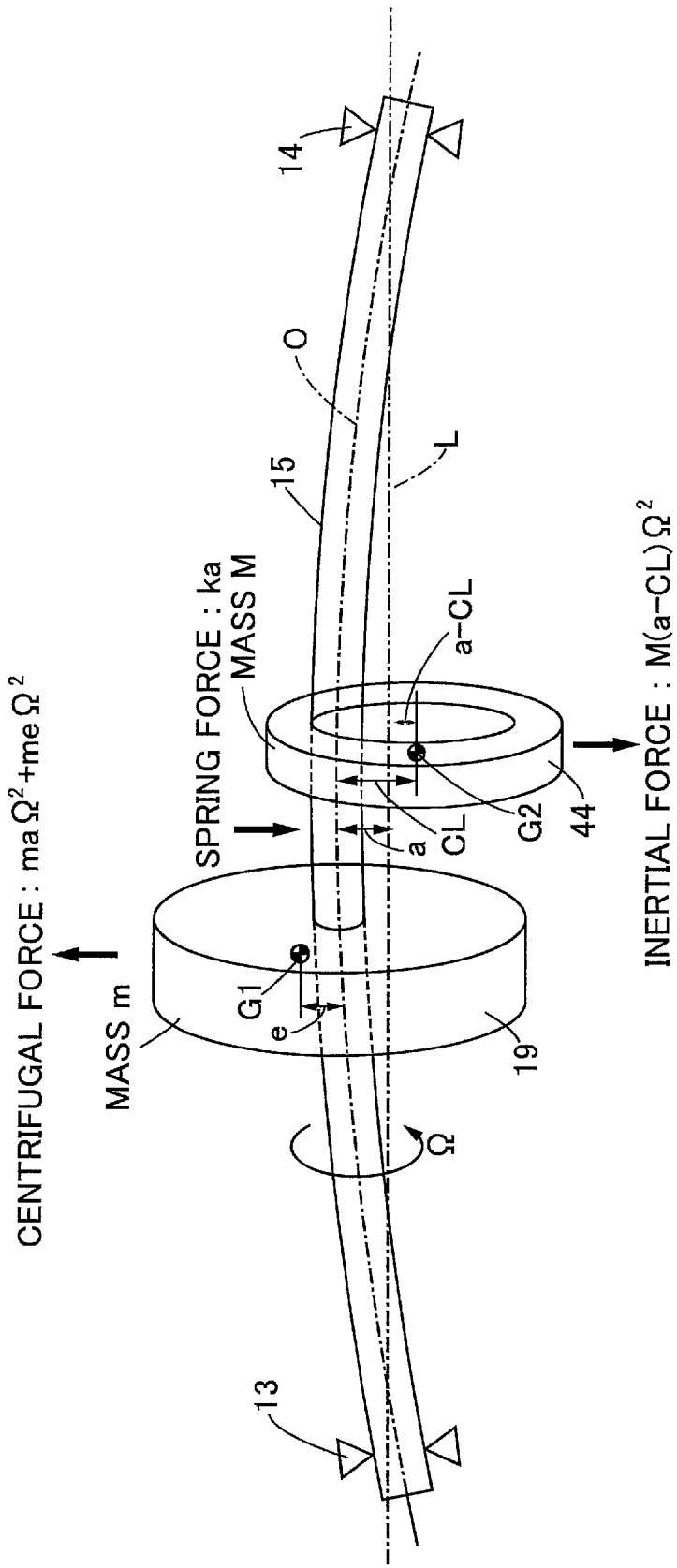

FIG.4
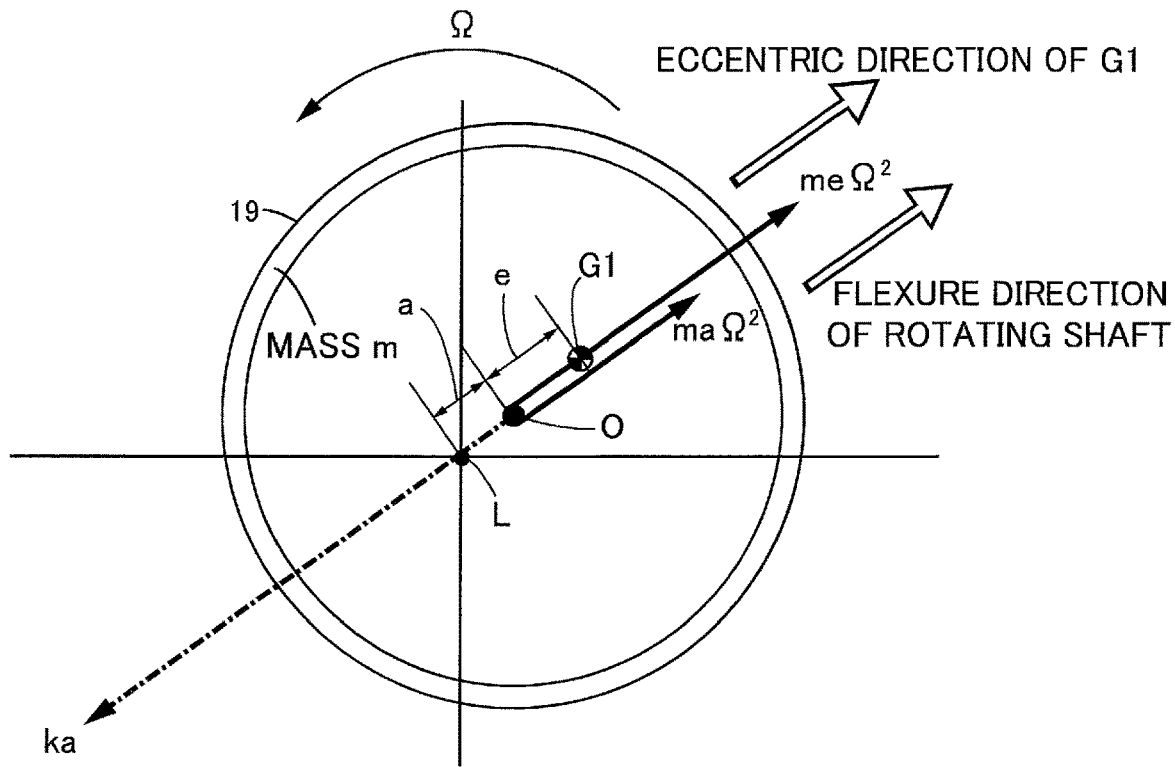
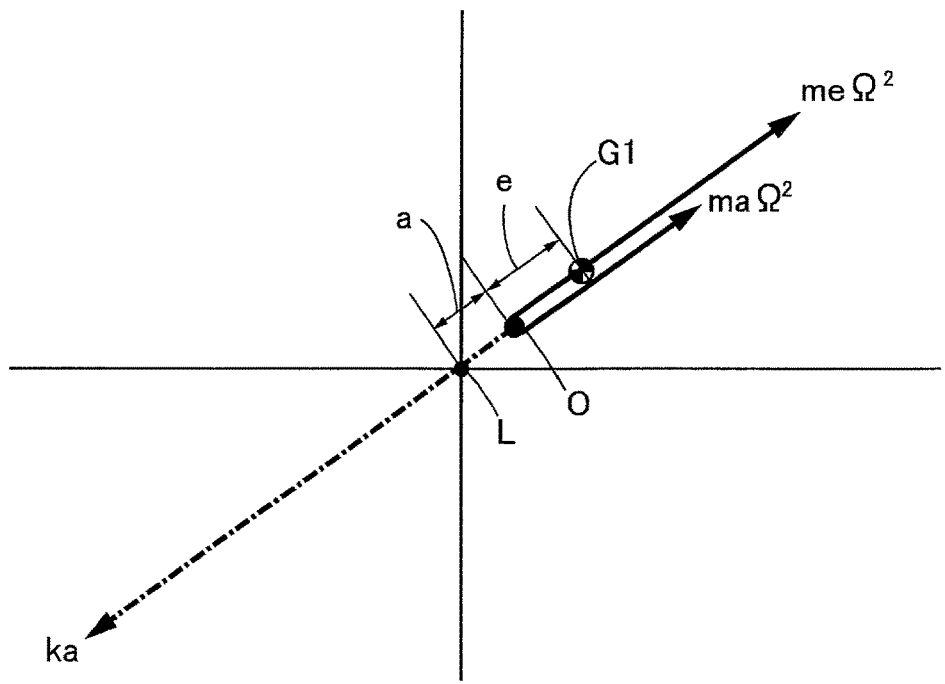

FIG.5
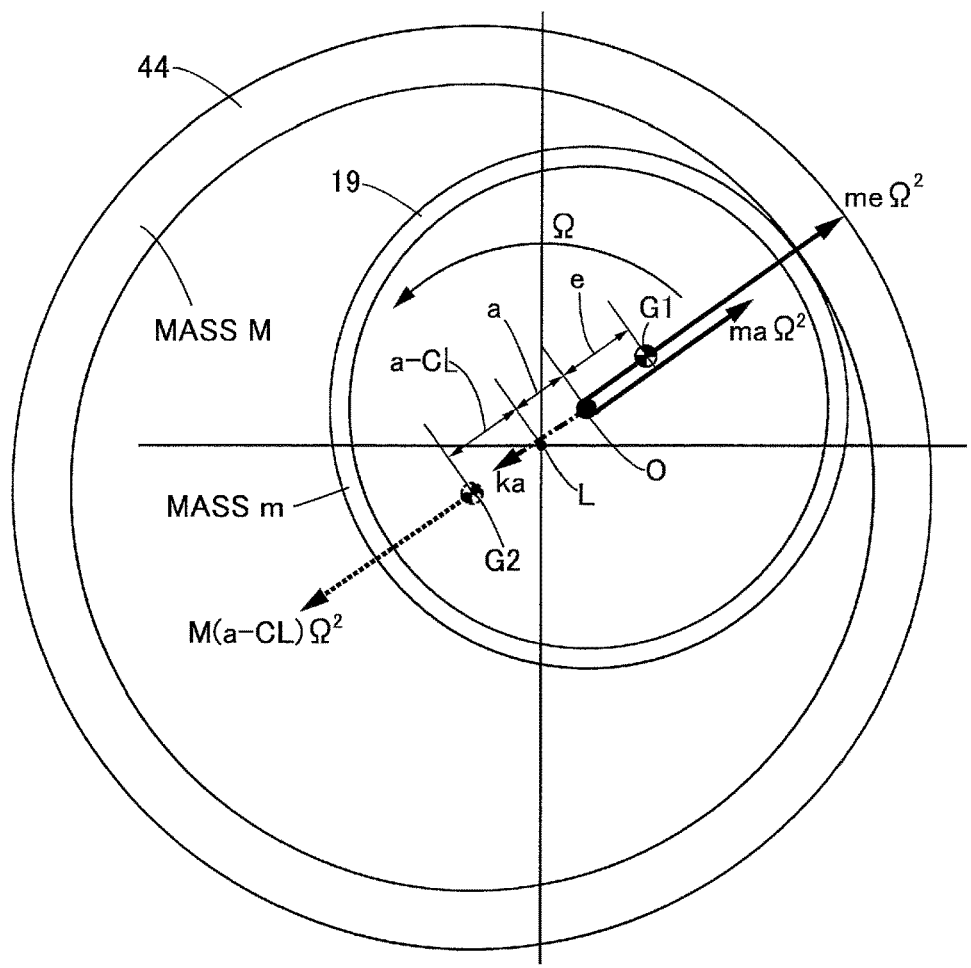
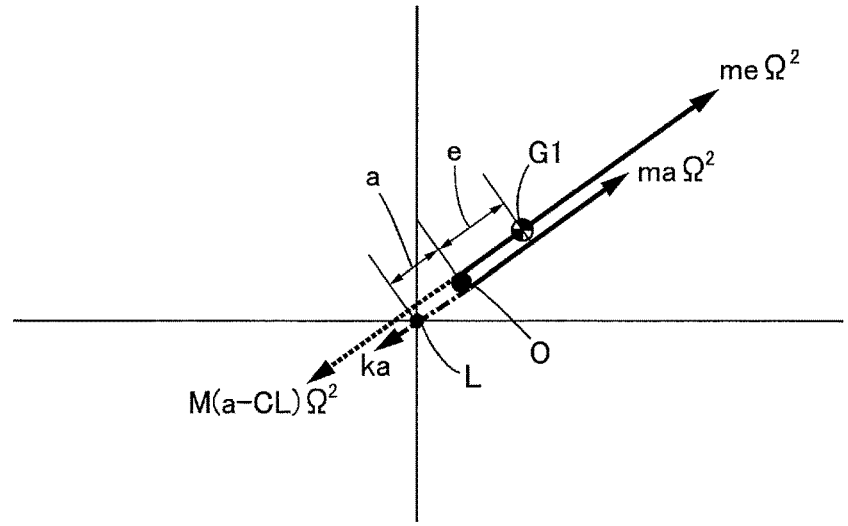

FIG.6
$\Omega \gg \Omega_0$ (WITHOUT RING)
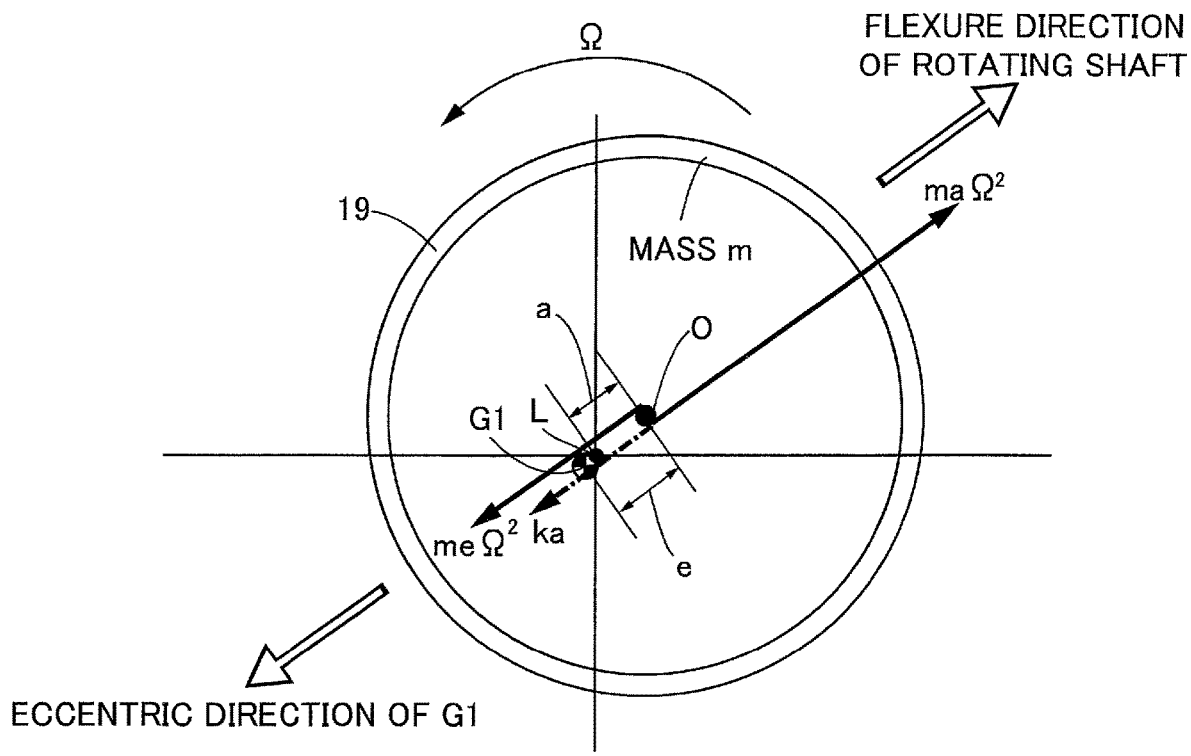
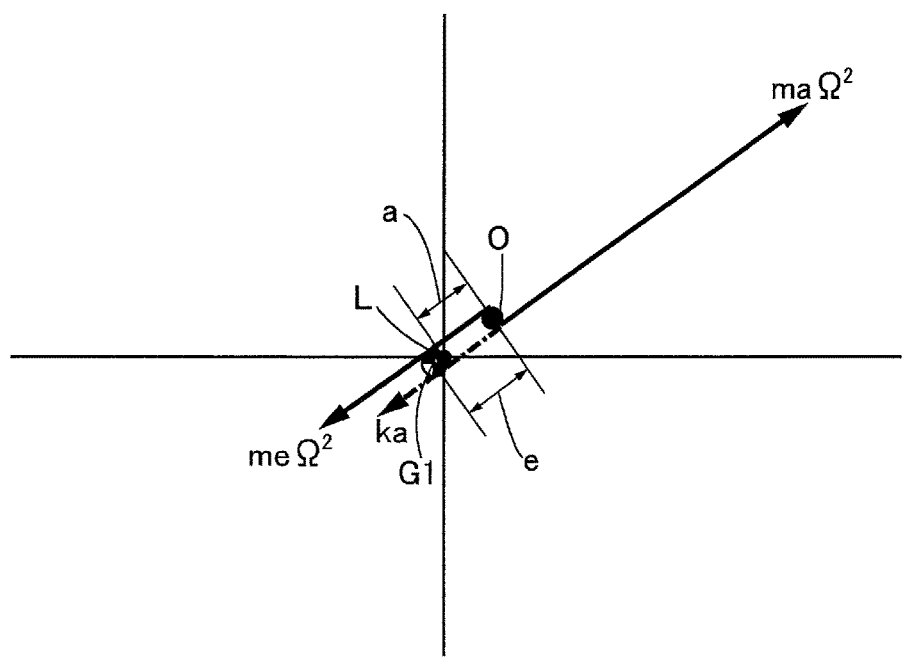

FIG.7
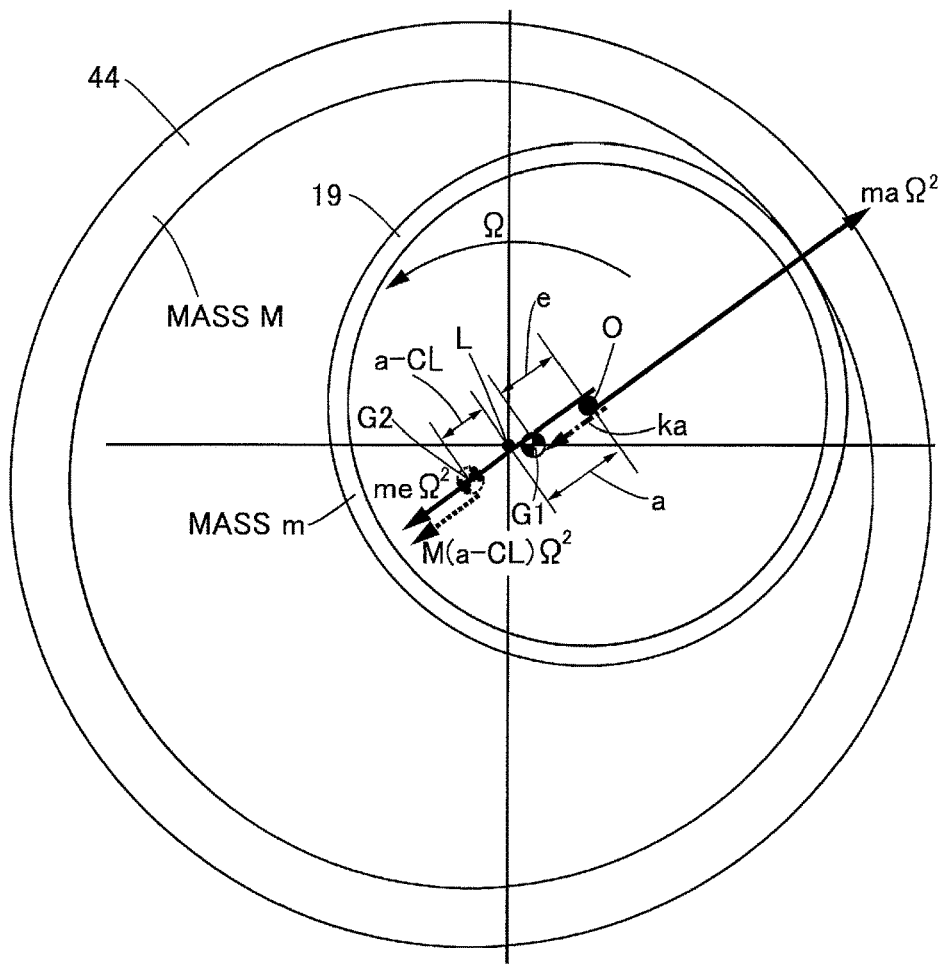
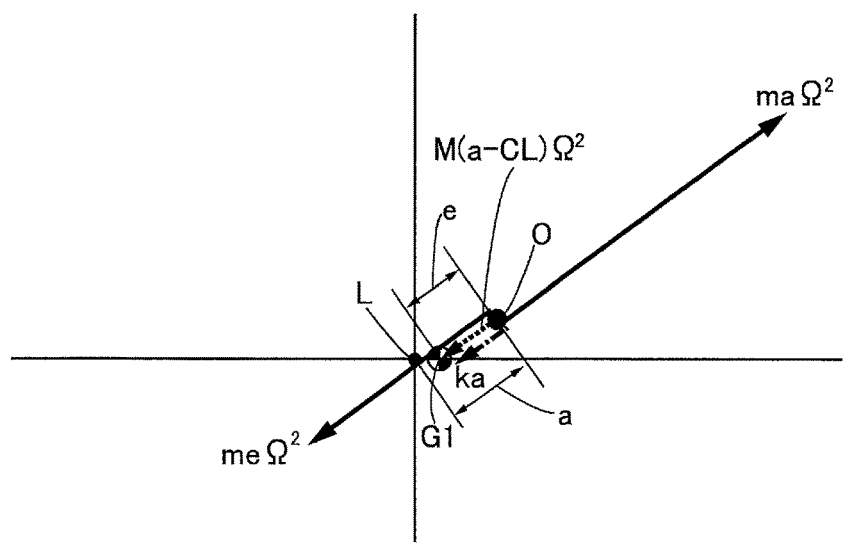

VIBRATION REDUCING DEVICE FOR GAS TURBINE ENGINE

CROSS REFERENCE TO RELATED APPLICATIONS

The present application claims priority under 35 U.S.C. § 119 to Japanese Patent Application No. 2019-40174 filed Mar. 6, 2019 the entire contents of which are hereby incorporated by reference.

BACKGROUND OF THE INVENTION

Field of the Invention

The present invention relates to a vibration reducing device for a gas turbine engine, comprising a rotating shaft that includes a first mass member, a plurality of bearings that rotatably support the rotating shaft, and a stationary body that supports the bearings.

Description of the Related Art

Japanese Patent Application Laid-open No. 8-261231 has made known an arrangement in which, in order to suppress centrifugal whirling vibration of a rotating shaft of a gas turbine engine, a bearing supporting the rotating shaft is provided with a squeeze film damper.

The squeeze film damper has the problem that there is a restriction on the oil film thickness of the squeeze film that can give an effective vibration attenuation effect, and if the rotating shaft moves in the radial direction in response to the input of a large vibrational load and the oil film thickness of the squeeze film becomes too small, the oil film becomes rigid and an effective vibration attenuation effect cannot be obtained. There is also the problem that, if a large oil film thickness is set in advance for the squeeze film in order to prevent the oil film from becoming rigid, not only is it not possible to obtain an effective vibration attenuation effect, but also the rotating shaft becomes susceptible to centrifugal whirling due to vibration.

In the arrangement described in Japanese Patent Application Laid-open No. 8-261231, a pair of annular concentric springs are disposed between a bearing metal and a bearing casing, and a constant oil film thickness is maintained for a squeeze film formed between the bearing metal and the bearing casing by means of the concentric springs, thus preventing the oil film thickness of the squeeze film from becoming too small.

However, in a case in which a fan blade of a front fan of the gas turbine engine breaks and a large centrifugal whirling vibration is generated in the rotating shaft, there is the problem that a sufficient damping effect cannot be obtained by the conventional squeeze film damper.

SUMMARY OF THE INVENTION

The present invention has been accomplished in light of the above circumstances, and it is an object thereof to reduce effectively centrifugal whirling vibration of a rotating shaft of a gas turbine engine.

In order to achieve the object, according to a first aspect of the present invention, there is provided a vibration reducing device for a gas turbine engine, comprising a rotating shaft that includes a first mass member, a plurality of bearings that rotatably support the rotating shaft, and a stationary body that supports the bearings, wherein an annular second mass member having an internal diameter thereof larger than an external diameter of the rotating shaft is rotatably supported in a contact state at a position on the rotating shaft, at which position centrifugal whirling vibration is generated due to imbalance of the first mass member.

In accordance with the first aspect, since in the vibration reducing device for a gas turbine engine, which includes the rotating shaft containing the first mass member, the plurality of bearings rotatably supporting the rotating shaft, and the stationary body supporting the bearings, the annular second mass member having the internal diameter thereof larger than the external diameter of the rotating shaft is rotatably supported in a contact state at a position on the rotating shaft, at which position centrifugal whirling vibration is generated due to imbalance of the first mass member, due to the second mass member being eccentric in the opposite phase with respect to the rotating shaft eccentrically undergoing centrifugal whirling, it is possible to counterbalance the centrifugal force acting on the first mass member with the inertial force acting on the second mass member, thus enabling a damping effect to be exhibited.

According to a second aspect of the present invention, in addition to the first aspect, when the centrifugal whirling vibration of the rotating shaft is less than a predetermined value, the second mass member is supported on the stationary body in a state in which the second mass member is not in contact with the rotating shaft, and when the centrifugal whirling vibration of the rotating shaft attains the predetermined value or greater, the second mass member rotates while being in contact with the rotating shaft.

In accordance with the second aspect, since when the centrifugal whirling vibration of the rotating shaft is less than the predetermined value the second mass member is supported on the stationary body in a state in which the second mass member is not in contact with the rotating shaft, and when the centrifugal whirling vibration of the rotating shaft attains the predetermined value or greater the second mass member rotates while being in contact with the rotating shaft, it is possible to automatically operate the second mass member when vibration increases and damping is necessary, thus enabling a damping effect to be exhibited.

According to a third aspect of the present invention, in addition to the second aspect, the second mass member is supported on the stationary body via a break portion that breaks when the centrifugal whirling vibration of the rotating shaft attains the predetermined value or greater.

In accordance with the third aspect, since the second mass member is supported on the stationary body via the break portion, which breaks when the centrifugal whirling vibration of the rotating shaft attains the predetermined value or greater, it is possible to reliably operate the second mass member due to the break portion being broken when vibration increases and damping is necessary.

According to a fourth aspect of the present invention, in addition to the second aspect, at least one of the bearings is supported on the stationary body via a breakable fuse portion, and the second mass member is supported in a low friction state on the stationary body in a vicinity of at least one of the bearings.

In accordance with the fourth aspect, since at least the one of the bearings is supported on the stationary body via the breakable fuse portion, and the second mass member is supported in a low friction state on the stationary body in the vicinity of at least the one bearing, when centrifugal whirling vibration of the rotating shaft is generated, the fuse portion breaks, the amplitude of centrifugal whirling vibration further increases, and the second mass member makes contact with the rotating shaft, overcomes the frictional force between itself and the stationary body, and starts rotating, thereby enabling a damping effect by the second mass member to be exhibited.

According to a fifth aspect of the present invention, in addition to the first aspect, a guide portion is provided on the rotating shaft, the guide portion restricting movement of the second mass member in an axial direction.

In accordance with the fifth aspect, since the guide portion restricting movement of the second mass member in the axial direction is provided on the rotating shaft, it is possible to prevent the second mass member from moving in the axial direction on the rotating shaft.

According to a sixth aspect of the present invention, in addition to the first aspect, when a mass of the first mass member is defined as m, a mass of the second mass member is defined as M, a shaft amplitude of the rotating shaft is defined as a, a difference between the external diameter of the rotating shaft and the internal diameter of the second mass member is defined as CL, a support spring coefficient of the first mass member is defined as k, a centrifugal whirling angular velocity of the rotating shaft is defined as $\Omega$, and a distance from a center of the rotating shaft to a center of gravity of the first mass member is defined as e, when the centrifugal whirling angular velocity $\Omega$ of the rotating shaft is less than a centrifugal whirling resonant rotational speed $\Omega_0$ of the rotating shaft, in a radial load balance equation $$ma\Omega^2 + me\Omega^2 - ka = M(a-CL)\Omega^2$$

the mass M of the second mass member is set so that the shaft amplitude a of the rotating shaft becomes a minimum, and when the centrifugal whirling angular velocity $\Omega$ of the rotating shaft is larger than the centrifugal whirling resonant rotational speed $\Omega_0$ of the rotating shaft, in a radial load balance equation $$ma\Omega^2 - me\Omega^2 - ka = M(a-CL)\Omega^2$$

the mass M of the second mass member is set so that the shaft amplitude a of the rotating shaft becomes a minimum.

In accordance with the sixth aspect, when the mass of the first mass member is defined as m, the mass of the second mass member is defined as M, the shaft amplitude of the rotating shaft is defined as a, the difference between the external diameter of the rotating shaft and the internal diameter of the second mass member is defined as CL, the support spring coefficient of the first mass member is defined as k, the centrifugal whirling angular velocity of the rotating shaft is defined as $\Omega$, and the distance from the center of the rotating shaft to the center of gravity of the first mass member is defined as e, when the centrifugal whirling angular velocity $\Omega$ of the rotating shaft is less than a centrifugal whirling resonant rotational speed $\Omega_0$, in the radial load balance equation $$ma\Omega^2 + me\Omega^2 - ka = M(a-CL)\Omega^2$$

the mass M of the second mass member is set so that the shaft amplitude a of the rotating shaft becomes a minimum, when the centrifugal whirling angular velocity $\Omega$ of the rotating shaft is larger than the centrifugal whirling resonant rotational speed $\Omega_0$ of the rotating shaft, in the radial load balance equation $$ma\Omega^2 - me\Omega^2 - ka = M(a-CL)\Omega^2$$

the mass M of the second mass member is set so that the shaft amplitude a of the rotating shaft becomes a minimum, and it is therefore possible for a damping effect by the second mass member to be exhibited to the maximum.

According to a seventh aspect of the present invention, in addition to the first aspect, the first mass member is a front fan, and the second mass member is supported on a shaft portion of a fan disk that supports the front fan.

In accordance with the seventh aspect, since the first mass member is the front fan, and the second mass member is supported on the shaft portion of the fan disk, which supports the front fan, it is possible to reduce, by means of the second mass member, centrifugal whirling vibration of the rotating shaft caused by imbalance of the front fan.

According to an eighth aspect of the present invention, in addition to the first aspect, the first mass member is a front fan, and the second mass member is supported on a shaft portion of a nose cone that rotates integrally with the front fan.

In accordance with the eighth aspect, since the first mass member is the front fan, and the second mass member is supported on the shaft portion of the nose cone, which rotates integrally with the front fan, it is possible to reduce, by means of the second mass member, centrifugal whirling vibration of the rotating shaft caused by imbalance of the front fan.

Note that a front first bearing 13 and a rear first bearing 14 of an embodiment correspond to the bearings of the present invention, and a step portion 15*b* and a clip 45 of the embodiment correspond to the guide portion of the present invention.

The above and other objects, characteristics and advantages of the present invention will be clear from detailed descriptions of the preferred embodiment which will be provided below while referring to the attached drawings.

BRIEF DESCRIPTION OF THE DRAWINGS

FIG. 3 is a diagram in which a damping device of the present embodiment is modeled.

FIG. 4 is a diagram for explaining the operation when a centrifugal whirling angular velocity $\Omega$ of a rotating shaft is smaller than a resonance angular velocity $\Omega_0$ and it has no second mass member.

FIG. 5 is a diagram for explaining the operation when the centrifugal whirling angular velocity $\Omega$ of the rotating shaft is smaller than the resonance angular velocity $\Omega_0$ and it has a second mass member.

FIG. 6 is a diagram for explaining the operation when the centrifugal whirling angular velocity $\Omega$ of the rotating shaft is larger than the resonance angular velocity $\Omega_0$ and it has no second mass member.

FIG. 7 is a diagram for explaining the operation when the centrifugal whirling angular velocity $\Omega$ of the rotating shaft is larger than the resonance angular velocity $\Omega_0$ and it has a second mass member.

DESCRIPTION OF THE PREFERRED EMBODIMENT

An embodiment of the present invention will be explained below based on FIG. 1 to FIG. 8. In the following description reference numbers corresponding to components of an exemplary embodiment are included only for ease of understanding, but the applicant's claims are not limited to the exemplary embodiment or to specific components of the exemplary embodiment.

Figure 1:
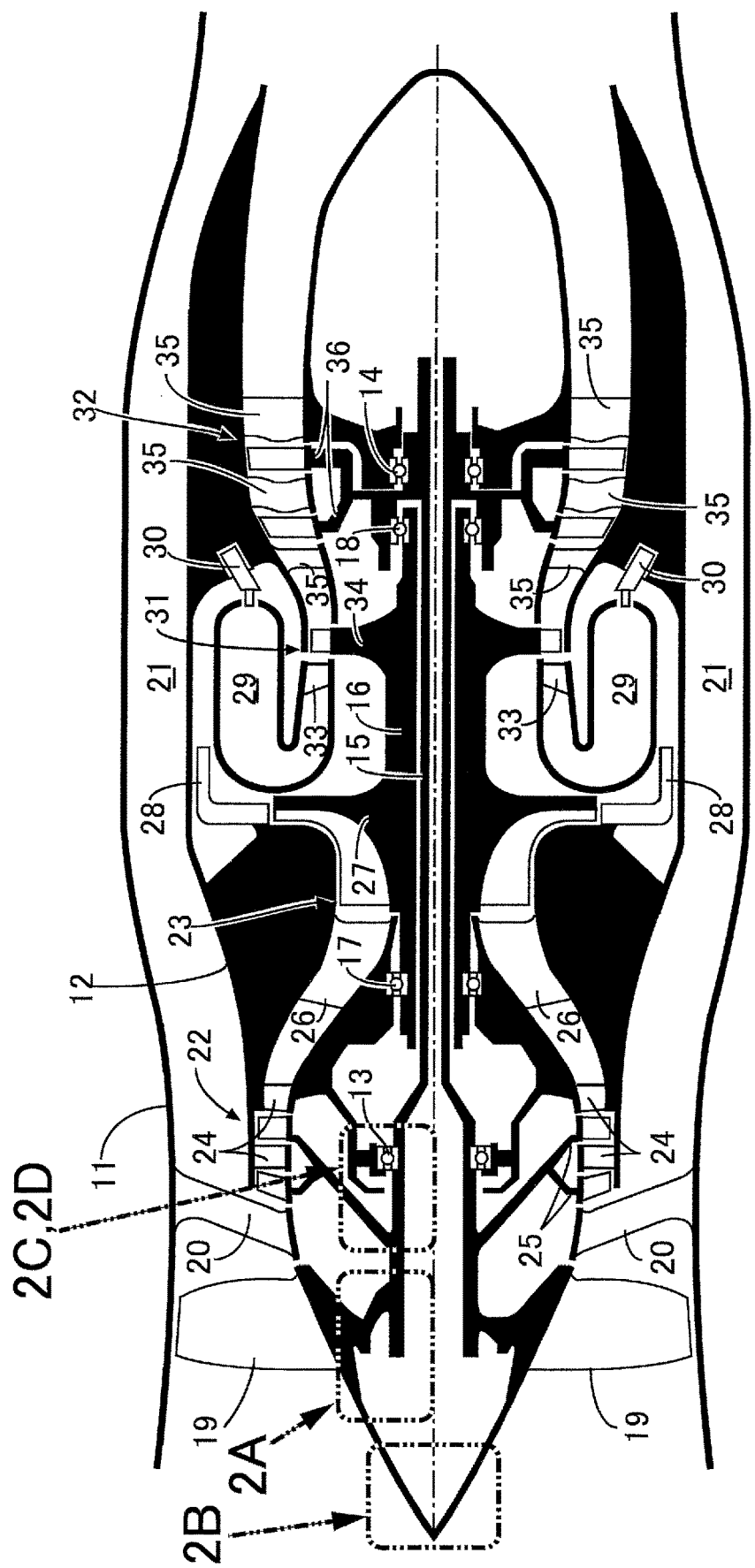
FIG. 1 is a diagram showing the overall structure of a gas turbine engine.

As shown in FIG. 1, a gas turbine engine for an airplane to which the present invention is applied includes an outer casing 11 and an inner casing 12, a front part and a rear part of a low pressure system shaft 15 being rotatably supported in the interior of the inner casing 12 via a front first bearing 13 and a rear first bearing 14 respectively. A tubular high pressure system shaft 16 is relatively rotatably fitted around the outer periphery of an axially intermediate part of the low pressure system shaft 15, a front part of the high pressure system shaft 16 is rotatably supported on the inner casing 12 via a front second bearing 17, and a rear part of the high pressure system shaft 16 is relatively rotatably supported on the low pressure system shaft 15 via a rear second bearing 18.

A front fan 19 having a blade tip facing an inner face of the outer casing 11 is fixed to the front end of the low pressure system shaft 15; part of the air sucked in by the front fan 19 passes through stator vanes 20 disposed between the outer casing 11 and the inner casing 12, part thereof then passes through an annular bypass duct 21 formed between the outer casing 11 and the inner casing 12 and is made to issue rearward, and the rest of the air is supplied to an axial low pressure compressor 22 and a centrifugal high pressure compressor 23 disposed in the interior of the inner casing 12.

The low pressure compressor 22 includes stator vanes 24 that are fixed in the interior of the inner casing 12 and a low pressure compressor wheel 25 that includes compressor blades on the outer periphery and is fixed to the low pressure system shaft 15. The high pressure compressor 23 includes stator vanes 26 that are fixed in the interior of the inner casing 12 and a high pressure compressor wheel 27 that includes compressor blades on the outer periphery and is fixed to the high pressure system shaft 16.

A reverse flow combustion chamber 29 is disposed to the rear of a diffuser 28 that is connected to the outer periphery of the high pressure compressor wheel 27, and fuel is injected into the interior of the reverse flow combustion chamber 29 from a fuel injection nozzle 30. The fuel and air are mixed in the interior of the reverse flow combustion chamber 29 and undergo combustion, and the combustion gas thus generated is supplied to a high pressure turbine 31 and a low pressure turbine 32.

The high pressure turbine 31 includes nozzle guide vanes 33 fixed in the interior of the inner casing 12 and a high pressure turbine wheel 34 that includes turbine blades on the outer periphery and is fixed to the high pressure system shaft 16. The low pressure turbine 32 includes nozzle guide vanes 35 fixed in the interior of the inner casing 12 and a low pressure turbine wheel 36 that includes turbine blades on the outer periphery and is fixed to the low pressure system shaft 15.

Therefore, when the high pressure system shaft 16 is driven by means of a starter motor, which is not illustrated, air sucked in by the high pressure compressor wheel 27 is supplied to the reverse flow combustion chamber 29, is mixed with fuel, and undergoes combustion, and the combustion gas thus generated drives the high pressure turbine wheel 34 and the low pressure turbine wheel 36. As a result, the low pressure system shaft 15 and the high pressure system shaft 16 rotate and the front fan 19, the low pressure compressor wheel 25, and the high pressure compressor wheel 27 compress air and supply it to the reverse flow combustion chamber 29, and the gas turbine engine thus continues to run even when the starter motor is stopped.

While the gas turbine engine is running, part of the air sucked in by the front fan 19 passes through the bypass duct 21, is made to issue rearward, and generates the main thrust, particularly at a time of low speed flying. The rest of the air sucked in by the front fan 19 is supplied to the reverse flow combustion chamber 29, is mixed with fuel, undergoes combustion, drives the low pressure system shaft 15 and the high pressure system shaft 16, is then made to issue rearward, and generates a thrust.

Figure 2A:
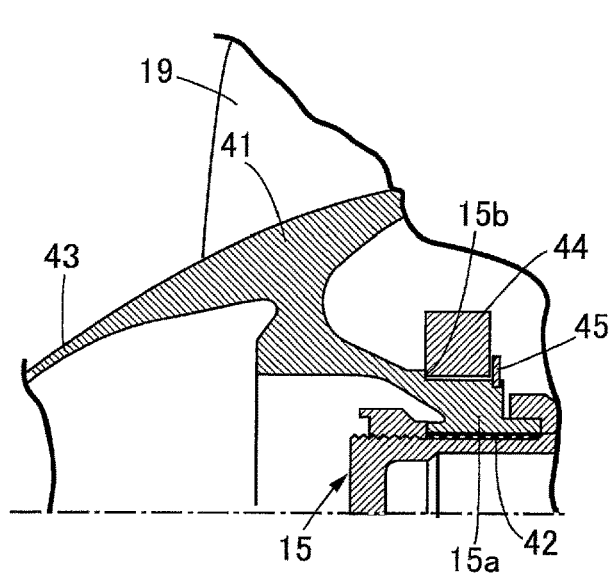
FIGS. 2A to 2D are enlarged views of parts 2A to 2D of FIG. 1, respectively.

The structure of a damping device related to the embodiment of the present invention is now explained by reference to FIG. 2A.

A shaft portion 15a of a fan disk 41 is joined to the front end of the low pressure system shaft 15 by a spline join 42, and the front fan 19 is radially mounted on the outer periphery of the fan disk 41. A conical nose cone 43 for flow-aligning sucked-in air is provided at the front end of the fan disk 41. The shaft portion 15a of the fan disk 41, which is coaxial with the low pressure system shaft 15 and rotates together therewith, forms part of the low pressure system shaft 15, and an annular damping ring 44 is rotatably supported on the outer periphery of the shaft portion 15a. The damping ring 44 is disposed on the radially inner side of the front fan 19 and positioned in the axial direction by being sandwiched between a clip 45 and a step portion 15b provided on the low pressure system shaft 15.

Hereinafter, the front fan 19 fixed to the low pressure system shaft 15 and rotating together therewith is called a first mass member 19, the damping ring 44 is called a second mass member 44, the low pressure system shaft 15 is called a rotating shaft 15, and part of the inner casing 12 supporting the rotating shaft 15 is called a stationary body 12.

FIG. 3 to FIG. 5 show modeling of the damping device of the present embodiment in order to explain the effect of the second mass member 44 in a state in which a centrifugal whirling angular velocity $\Omega$ of the rotating shaft 15 is smaller than a resonance angular velocity $\Omega_0$ of the rotating shaft 15. Here, m is the mass of the first mass member 19, M is the mass of the second mass member 44, and k is a support spring coefficient when the rotating shaft 15 undergoing centrifugal whirling while flexing and deforming is considered to be elastically supported on the stationary body 12, which is said part of the inner casing 12.

As is well known, when the input frequency of an external force is smaller than a resonant frequency, the direction of the external force and the direction of displacement are in phase. Therefore, when the centrifugal whirling angular velocity $\Omega$ of the rotating shaft 15 is smaller than the resonance angular velocity $\Omega_0$ of the rotating shaft 15, the direction of eccentricity of a center of gravity G1 of the first mass member 19 with respect to a rotational axis L and the direction of eccentricity of a center O of the rotating shaft 15 with respect to the rotational axis L are in phase.

In FIG. 3, for example, when one of the plurality of fan blades of the first mass member 19 (front fan 19) breaks, the center of gravity G1 of the first mass member 19, which is positioned on the center O of the rotating shaft 15 under normal conditions, would become eccentric only by a distance e with respect to the center O of the rotating shaft 15, and the rotating shaft 15 would undergo centrifugal whirling while flexing by means of the centrifugal force acting on the center of gravity G1, thus generating vibration. Due to the centrifugal whirling of the rotating shaft 15, the center O of the rotating shaft 15 is displaced only by a distance a with respect to the rotational axis L of the rotating shaft 15.

When the rotating shaft 15 undergoes centrifugal whirling, the second mass member 44 rotatably supported on the outer periphery thereof with a gap CL therebetween (the difference between the inner peripheral radius of the second mass member 44 and the outer peripheral radius of the rotating shaft 15) rotates eccentrically in a state in which the phase is displaced by 180° with respect to the direction of eccentricity of the first mass member 19. In this arrangement, the amount of eccentricity of a center of gravity G2 of the second mass member 44 with respect to the rotational axis L of the rotating shaft 15 is a−CL, and the amount of eccentricity of the center of gravity G1 of the first mass member 19 with respect to the rotational axis L of the rotating shaft 15 is a+e. Furthermore, in an attempt to restore the flexing rotating shaft 15, a bearing reaction force, which is a spring force corresponding to the displacement a of the rotational axis L, acts on the rotating shaft 15 from the stationary body 12 via the front first bearing 13 and the rear first bearing 14. Therefore, if the bearing reaction force and the centrifugal force generated by eccentric rotation of the first mass member 19 can be counteracted by an inertial force generated by eccentric rotation of the second mass member 44, it is possible to suppress the centrifugal whirling of the rotating shaft 15 and reduce the vibration.

FIG. 4 shows the load acting on the rotating shaft 15 when it has no second mass member 44; a centrifugal force $ma\Omega^2+me\Omega^2$ acts on the first mass member 19, for which the center of gravity G1 is eccentric only by a distance a+e with respect to the rotational axis L, and ka, which is a spring force that attempts to restore the flexing rotating shaft 15, acts thereon in the opposite direction to the above.

FIG. 5 shows the load acting on the rotating shaft 15 when the second mass member 44 is added to FIG. 4; since the center of the second mass member 44 (that is, the center of gravity G2 of the second mass member 44) becomes eccentric only by the distance a−CL with respect to the rotational axis L of the rotating shaft 15 in the opposite direction to the direction of eccentricity of the center of gravity G1 of the first mass member 19, an inertial force $M(a-CL)\Omega^2$ acts on the second mass member 44 in a direction opposite to the centrifugal force $ma\Omega^2+me\Omega^2$, and therefore the radial load balance equation $$ma\Omega^2+me\Omega^2-ka=M(a-CL)\Omega^2$$

holds. In this radial load balance equation, if the mass m of the second mass member 44 is set so that the amplitude a of the center O of the rotating shaft 15 becomes a minimum, the centrifugal whirling of the rotating shaft 15 generated by imbalance of the first mass member 19 can be suppressed, thus enabling a damping effect to be exhibited.

On the other hand, FIG. 6 and FIG. 7 show a state in which the centrifugal whirling angular velocity $\Omega$ of the rotating shaft 15 is larger than the resonance angular velocity $\Omega_0$ of the rotating shaft 15. As is well known, when the input frequency of an external force is larger than the resonant frequency, the direction of the external force and the direction of displacement have opposite phases. Therefore, when the centrifugal whirling angular velocity $\Omega$ of the rotating shaft 15 is larger than the resonance angular velocity $\Omega_0$ of the rotating shaft 15, the direction of eccentricity of the center of gravity G1 of the first mass member 19 with respect to the rotational axis L and the direction of eccentricity of the center O of the rotating shaft 15 with respect to the rotational axis L have opposite phases.

FIG. 6 shows the load acting on the rotating shaft 15 when it has no second mass member 44; a centrifugal force $ma\Omega^2-me\Omega^2$ acting on the first mass member 19, for which the center of gravity G1 is eccentric only by a distance a−e with respect to the rotational axis L, and ka, which is a spring force in the direction opposite to the above that attempts to restore the flexing rotating shaft 15, act thereon.

FIG. 7 shows the radial load acting on the rotating shaft 15 when the second mass member 44 is added to FIG. 6. Since the center O of the second mass member 44 (that is, the center of gravity G2 of the second mass member 44) becomes eccentric by the distance a−CL with respect to the rotational axis L of the rotating shaft 15 in the opposite direction to the direction of eccentricity of the center of gravity G1 of the first mass member 19, an inertial force $M(a-CL)\Omega^2$ acts on the second mass member 44 in the opposite direction to the centrifugal force $ma\Omega^2-me\Omega^2$, and therefore the radial load balance equation $$ma\Omega^2-me\Omega^2-ka=M(a-CL)\Omega^2$$

holds. In this radial load balance equation, if the mass m of the second mass member 44 is set so that the amplitude a of the center O of the rotating shaft 15 becomes a minimum, centrifugal whirling of the rotating shaft 15 generated by imbalance of the first mass member 19 can be suppressed, thus enabling a damping effect to be exhibited.

Figure 8:
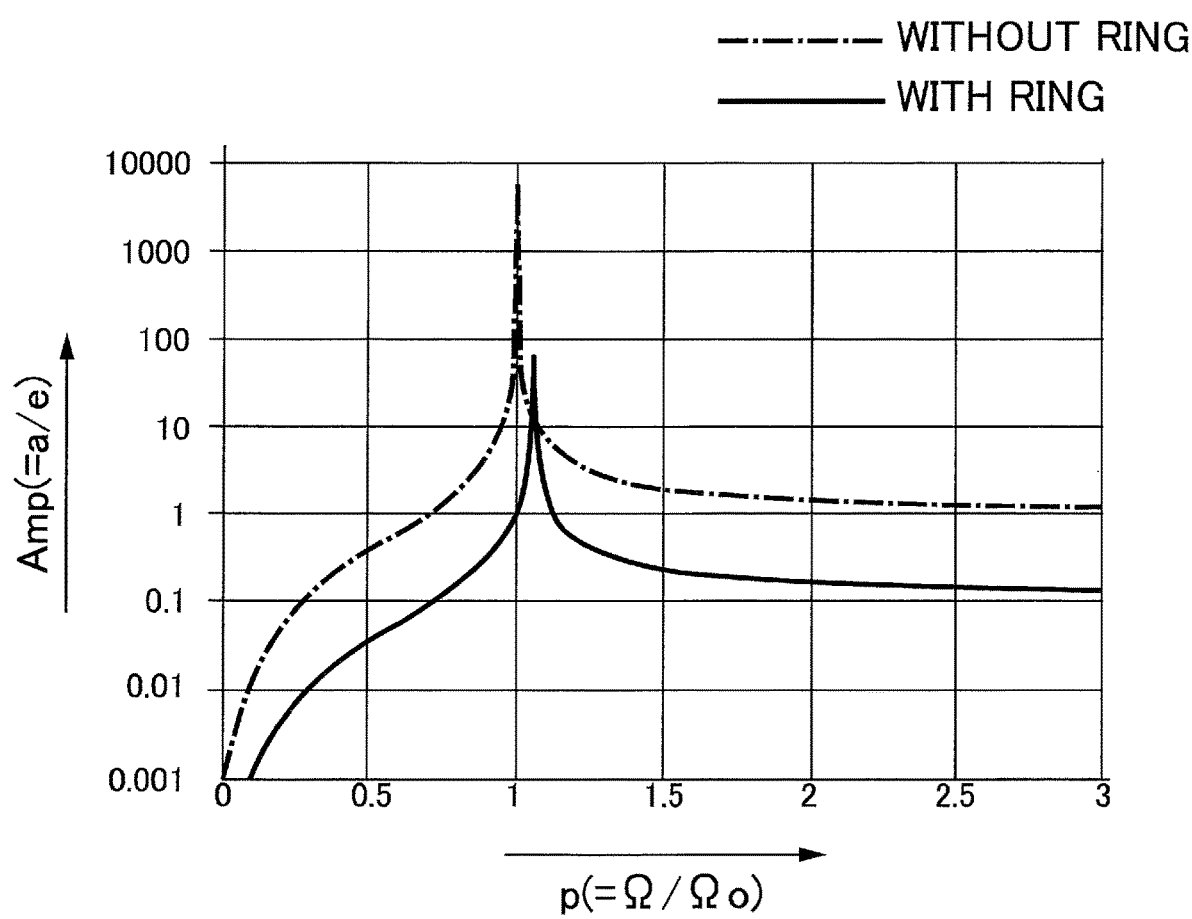
FIG. 8 is a graph showing a damping effect due to the second mass member.

FIG. 8 shows the effect of the damping device of the present embodiment; the single-dotted broken line shows the magnitude of centrifugal whirling vibration when there is no second mass member 44, and the solid line shows the magnitude of centrifugal whirling vibration when there is the second mass member 44. It is found that due to the second mass member 44 being provided, centrifugal whirling vibration is reduced over a wide frequency region straddling the resonant frequency $\Omega_0$.

The position at which the second mass member 44 is provided is not limited to the above embodiment, and the second mass member 44 can be provided at various positions on the low pressure system shaft 15 as illustrated below.

Figure 2B:
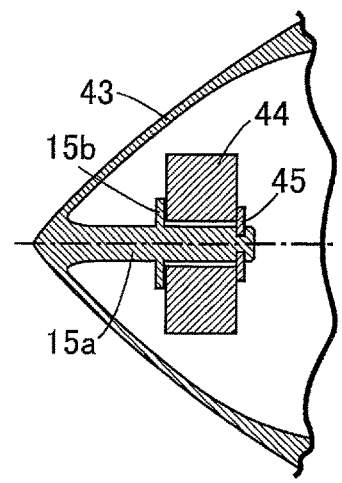

In an embodiment shown in FIG. 2B, the shaft portion 15a is provided on the centerline of the nose cone 43 of the front fan 19, which is the first mass member 19, and the second mass member 44 is rotatably supported on the shaft portion 15a and positioned in the axial direction by means of the step portion 15b and the clip 45.

Figure 2C:
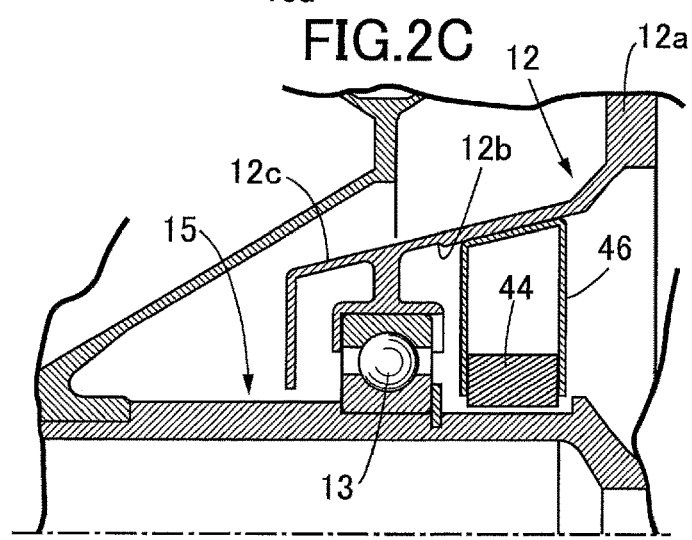

In an embodiment shown in FIG. 2C, a separation portion 12c is formed on a main body portion 12a of the stationary body 12 via a brittle fuse portion 12b, and the rotating shaft 15 is supported on the separation portion 12c via the front first bearing 13. An annular retaining member 46 formed so as to have a squared U-shaped section is fixed to the main body portion 12a adjacent to the separation portion 12c, and the second mass member 44 supported on the outer periphery of the rotating shaft 15 is fitted to the retaining member 46 and retained in a low friction state.

When the rotating shaft 15 is not undergoing centrifugal whirling or the amplitude of centrifugal whirling is small, an outer peripheral face of the rotating shaft 15 does not abut against an inner peripheral face of the second mass member 44, and the second mass member 44 is retained by the retaining member 46 with a frictional force. When the rotating shaft 15 undergoes centrifugal whirling and the amplitude becomes a predetermined value or greater, the fuse portion 12b of the stationary body 12 is broken by vibration and the separation portion 12c is separated from the main body portion 12a, thus detaching the rotating shaft 15 from the main body portion 12a of the stationary body 12 and suppressing transmission of the vibration to another part of the gas turbine engine.

Due to the amplitude of the centrifugal whirling of the rotating shaft 15 increasing, an outer peripheral face of the rotating shaft 15 abuts against an inner peripheral face of the second mass member 44, and the second mass member 44 overcomes the frictional force acting between itself and the retaining member 46 with the load received from the rotating shaft 15 and starts rotating, thus generating a damping force suppressing the centrifugal whirling vibration of the rotating shaft 15.

Figure 2D:
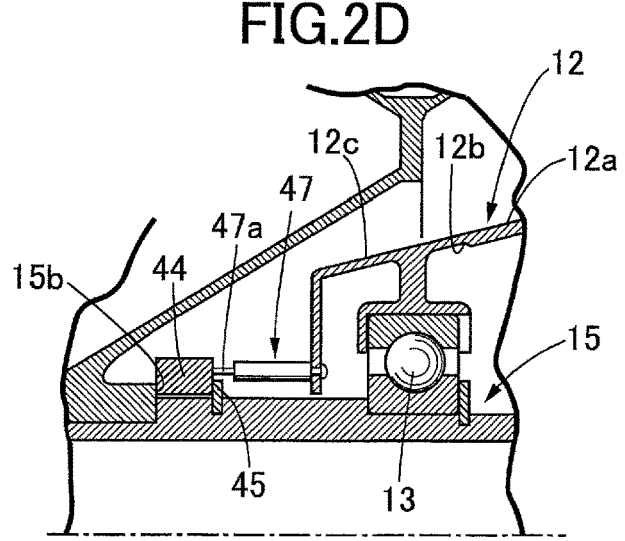

In an embodiment shown in FIG. 2D, a small diameter break portion 47a provided at the extremity of a plurality of pins 47 fixed to the separation portion 12c of the stationary body 12 in the axial direction is connected to the second mass member 44 supported on the outer periphery of the rotating shaft 15. When the rotating shaft 15 is not undergoing centrifugal whirling or the amplitude of centrifugal whirling is small, the outer peripheral face of the rotating shaft 15 does not abut against the inner peripheral face of the second mass member 44, and the second mass member 44 is retained on the stationary body 12 by means of the pins 47. When the rotating shaft 15 undergoes centrifugal whirling and the amplitude attains a predetermined value or greater, the outer peripheral face of the rotating shaft 15 abuts against the inner peripheral face of the second mass member 44, the fuse portion 12b breaks due to vibration, and the separation portion 12c is separated from the main body portion 12a. As a result, the break portion 47a of the pin 47 is broken by a load from the rotating shaft 15, and the second mass member 44 thereby starts rotating, thus generating a damping force suppressing the centrifugal whirling vibration.

An embodiment of the present invention is explained above, but the present invention may be modified in a variety of ways as long as the modifications do not depart from the gist of the present invention.

For example, the location where the second mass member 44 of the present invention is provided is not limited to the embodiment, and it may be provided at any location of any rotating shaft of a gas turbine engine.

What is claimed is:

1. A vibration reducing device for a gas turbine engine, comprising a rotating shaft that includes a first mass member, a plurality of bearings that rotatably support the rotating shaft, and a stationary body that supports the bearings,
wherein an annular second mass member having an internal diameter thereof larger than an external diameter of the rotating shaft is rotatably supported in a contact state at a position on the rotating shaft, at which position centrifugal whirling vibration is generated due to imbalance of the first mass member, and
wherein when the centrifugal whirling vibration of the rotating shaft is less than a predetermined value, the second mass member is supported on the stationary body in a state in which the second mass member is not in contact with the rotating shaft, and when the centrifugal whirling vibration of the rotating shaft attains the predetermined value or greater, the second mass member rotates while being in contact with the rotating shaft.

2. The vibration reducing device for a gas turbine engine according to claim 1, wherein the second mass member is supported on the stationary body via a break portion that breaks when the centrifugal whirling vibration of the rotating shaft attains the predetermined value or greater.

3. The vibration reducing device for a gas turbine engine according to claim 1, wherein
at least one of the bearings is supported on the stationary body via a breakable fuse portion, and
the second mass member is supported in a low friction state on the stationary body in a vicinity of at least one of the bearings.

4. A vibration reducing device for a gas turbine engine, comprising a rotating shaft that includes a first mass member, a plurality of bearings that rotatably support the rotating shaft, and a stationary body that supports the bearings,
wherein an annular second mass member having an internal diameter thereof larger than an external diameter of the rotating shaft is rotatably supported in a contact state at a position on the rotating shaft, at which position centrifugal whirling vibration is generated due to imbalance of the first mass member, and
wherein a guide portion is provided on the rotating shaft, the guide portion restricting movement of the second mass member in an axial direction.

5. A vibration reducing device for a gas turbine engine, comprising a rotating shaft that includes a first mass member, a plurality of bearings that rotatably support the rotating shaft, and a stationary body that supports the bearings,
wherein an annular second mass member having an internal diameter thereof larger than an external diameter of the rotating shaft is rotatably supported in a contact state at a position on the rotating shaft, at which position centrifugal whirling vibration is generated due to imbalance of the first mass member, and
wherein
when a mass of the first mass member is defined as m, a mass of the second mass member is defined as M, a shaft amplitude of the rotating shaft is defined as a, a difference between the external diameter of the rotating shaft and the internal diameter of the second mass member is defined as CL, a support spring coefficient of the first mass member is defined as k, a centrifugal whirling angular velocity of the rotating shaft is defined as $\Omega$, and a distance from a center of the rotating shaft to a center of gravity of the first mass member is defined as e,
when the centrifugal whirling angular velocity $\Omega$ of the rotating shaft is less than a centrifugal whirling resonant rotational speed $\Omega_0$ of the rotating shaft, in a radial load balance equation $$ma\Omega^2 + me\Omega^2 - ka = M(a-CL)\Omega^2$$

the mass M of the second mass member is set so that the shaft amplitude a of the rotating shaft becomes a minimum, and
when the centrifugal whirling angular velocity $\Omega$ of the rotating shaft is larger than the centrifugal whirling resonant rotational speed $\Omega_0$ of the rotating shaft, in a radial load balance equation $$ma\Omega^2 - me\Omega^2 - ka = M(a-CL)\Omega^2$$

the mass M of the second mass member is set so that the shaft amplitude a of the rotating shaft becomes a minimum.

6. The vibration reducing device for a gas turbine engine according to claim 1, wherein
the first mass member is a front fan, and
the second mass member is supported on a shaft portion of a fan disk that supports the front fan.

7. The vibration reducing device for a gas turbine engine according to claim 1, wherein
the first mass member is a front fan, and the second mass member is supported on a shaft portion of a nose cone that rotates integrally with the front fan.

\* \* \* \* \*